Figure 1:
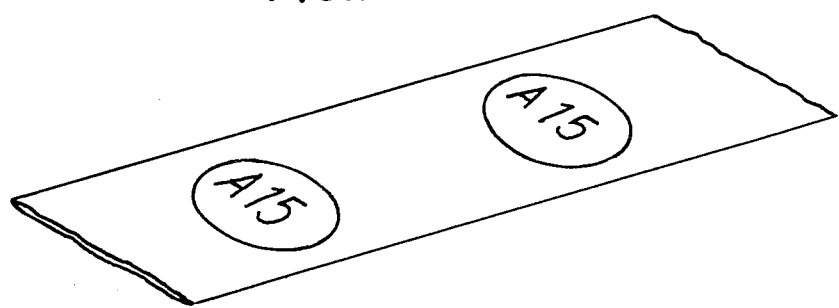

United States Patent [19]

Winkler

[11] 3,961,082

[45] June 1, 1976

[54] EDIBLE FOOD CASING PRINTED WITH WATER-RESISTANT INK

[76] Inventor: Bruno Winkler, Am Hummelberg 9, 6941 Oberflockenbach, Germany

[22] Filed: Mar. 7, 1973

[21] Appl. No.: 338,710

[30] Foreign Application Priority Data

Mar. 15, 1972 Germany............................ 2212398

[52] U.S. Cl.................................. 426/87; 426/140; 426/250; 426/383; 426/540; 426/641
[51] Int. Cl.²..................... A22C 13/00; A23L 1/275
[58] Field of Search ........... 426/105, 140, 177, 250, 426/277, 278, 138, 87, 383, 540, 641

[56] References Cited
UNITED STATES PATENTS

| | | | |
|---|---|---|---|
| 2,054,148 | 9/1936 | Walter | 426/87 |
| 3,446,633 | 5/1969 | Talty | 426/277 |
| 3,682,661 | 8/1972 | Turbak | 426/138 |

*Primary Examiner*—James R. Hoffman

[57] ABSTRACT

A water-resistant printed mark is applied to collagen food casings using an edible printing ink comprising a pigment dyestuff, a liquid vehicle, and a cross-linkable substance. After application of the ink mark, the tube is subjected to a heating and/or tanning treatment to effect cross-linking and render the mark water resistant.

31 Claims, 2 Drawing Figures

EDIBLE FOOD CASING PRINTED WITH WATER-RESISTANT INK

The invention relates to edible food casings, especially for sausages, which are printed with edible printing ink, a process for the manufacture of such casings, and to a printing ink for use in printing the food casings.

For convenience, the following description refers only to sausage casings, because it is to sausage casings that the invention is especially directed, but it will be understood that such edible casings may also be used for other foods.

Edible sausage casings have been known for a long time. For this purpose, either natural guts or artificial guts of natural material are used. As is known, edible casings comprising artificial guts can be manufactured from an animal skin fibre composition (collagen) either by the wet extrusion process or the dry extrusion process. In the wet extrusion process, a solution of collagen is extruded through an annular die into a coagulation bath. In the dry extrusion process, a pasty collagen mass is extruded directly to give a collagen tube. The resulting tube is subjected, both in the case of the wet extrusion process and in the case of the dry extrusion process, to a drying treatment, and, in order to improve the water resistance, to a hardening treatment or tanning.

The present invention is directed to a solution of the following problem:

In many countries the law stipulates the marking of sausages, which are packaged on a large scale in natural guts or in edible artificial guts made of collagen, with some form of inspection stamp. Packaged sausages carry this inspection stamp on the packaging and non-packaged sausages must be provided with a bill band carrying the inspection stamp. This way of marking is very labour-intensive and therefore expensive. It is the principal object of the present invention to overcome these disadvantages by providing a marking of the goods which is easy to apply and is durable. According to the invention, this object is achieved by applying to sausage casings made of edible material a water-resistant durable print in an edible ink.

Accordingly, the present invention provides sausage casings of edible material which are printed with a water-resistant edible printing ink.

The invention also provides a process for the manufacture of such printed sausage casings.

Finally, the invention provides an edible printing ink for use in printing the sausage casings.

According to the invention, the water-resistant print on the sausage casing consists of a printing ink which comprises (a) at least one pigment dyestuff, (b) at least one liquid vehicle for the pigment dyestuff, (c) at least one substance which can be crosslinked thermally and/or by means of a tanning agent and, if appropriate, also comprises a tanning agent and added oils.

The pigment dyestuff may be any of the coloured pigments which are permitted under the Foodstuffs Laws, and preferably comprises a titanium dioxide pigment.

Liquids customary for the purpose, for example, water, may be used as the liquid vehicle in which the pigment dyestuff is dispersed or suspended. However, the printing ink preferably contains liquids of low volatility since as a result of the absence of volatile liquids, such as water, thickening of the ink in the inking unit is avoided or substantially reduced. Liquids of low volatility which at the same time exert a plasticising action on the collagen tube are especially preferred for use. Known plasticisers which may be used are the plasticiser alcohols such as, for example, ethylene glycol, glycerine and sorbitol.

The presence in the printing ink of at least one substance which can be cross-linked thermally, optionally in conjunction with a tanning agent, or alternatively by such an agent alone, is very important for the production of a water-resistant print. Examples of such substances include proteins and cellulosic materials. Suitable proteins include gelatine, albumen, casein and also collagen itself. In addition to cellulose, which can also be employed in the form of its derivatives, such as methylcellulose, ethylcellulose and the like, other vegetable "builders", such as pectins or products closely related to the pectins, such as gum arabic, as well as alginates, are also suitable.

The presence of a cross-linkable substance, such as a protein or cellulose, is essential in order to achieve a water-resistant ink application. This is because the particular coloured pigment, for example, titanium dioxide, when embedded in protein, cellulose or some other cross-linkable substance, gives a sufficiently water-resistant application of ink after cross-linking which is achieved by means of a tanning agent or by drying by warming, optionally in conjunction with a tanning agent. In other words, the cross-linking fixes the coloured pigment.

Suitable tanning agents which may be used to bring about the cross-linking of the cross-linkable constituent or constituents of the printing ink and at the same time the hardening or tanning of the collagen tube include, for example, glyoxal, glutaraldehyde, formaldehyde, aluminium sulphate, iron sulphate, and the like.

Small proportions of oil in the ink improve the flexibility and hence the printing properties. Unsaturated vegetable oils, such as linseed oil or castor oil, are preferably used for this purpose.

The printing of the sausage casings is carried out immediately after drying the extruded collagen tube, which is as a rule effected in a long drying tunnel. The printing is carried out in a manner which is in itself known. During printing, the liquids contained in the ink, such as, for example, glycerine, sorbitol or other plasticisers, migrate into the collagen of the tube. After the ink has been applied (in the form, for example, of a stamp, a letter or script) the tube is rendered water-resistant, by means of a heat treatment and/or tanning treatment, thereby cross-linking the cross-linkable substances present in the printing ink. A heat treatment of, for example, 6 hours at 90°C will generally suffice.

The printed tube can then be subjected to further treatments, for example, plasticising and/or tanning treatment, and can also be gathered up to form a shirred tube before packaging.

The composition of the pasty printing ink is in itself not critical and can vary within relatively wide ranges. Examples of suitable compositions are as follows, all percentages being by weight.

| | | |
|---|---|---|
| (a) Pigment dyestuff | 10 to 60%, | preferably 25 to 50%, |
| (b) liquid vehicle | 30 to 80%, | preferably 50 to 60%, |
| (c) cross-linkable | 2 to 30%, | preferably 10 to 25%. |

3,961,082

If a tanning agent and/or added oils are included in the printing ink, the amounts of these additional components advantageously lie within the following ranges, each percentage being by weight: Tanning agent 0.01 to 0.5%, preferably 0.1 to 0.4%, oil 5 to 25%, preferably 10 to 20%.

Figure 2:
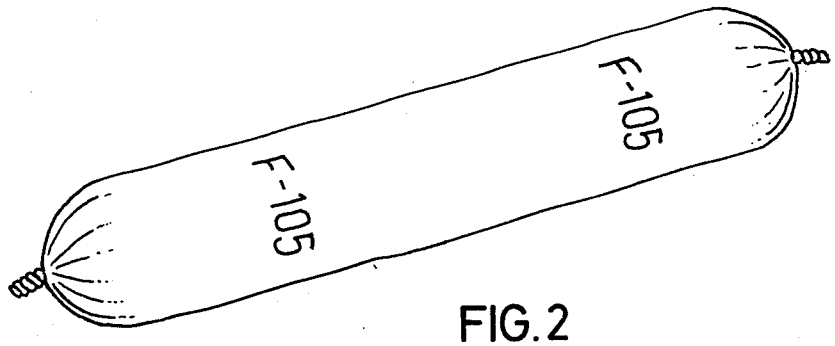

In the accompanying drawings, FIG. 1 shows, by way of example, a flat casing that has been printed in accordance with the invention; and FIG. 2 shows a sausage in the printed casing.

The table which follows contains a tabular summary of examples of formulations of inks, suitable for consumption, for printing edible small guts of hardened albumen.

Table

| substance | Basic formulation | A | B | C | D | E | F | G | H | I | J | K | L | M | N |
|---|---|---|---|---|---|---|---|---|---|---|---|---|---|---|---|
| Water | | 500 | | | | | | | | | | | | | |
| Glycerine | 300 | 100 | 500 | 500 | 300 | 300 | 300 | 300 | 300 | 300 | 500 | 150 | 200 | 200 | 300 |
| Titanium dioxide | 200 | 100 | 100 | 200 | 100 | 200 | 300 | 200 | 200 | 200 | 200 | 200 | 200 | 200 | 200 |
| Glyoxal (40% strength aqueous solution) | 1 | | 3 | 2 | 2 | 4 | 4 | | | | 5 | 2 | 4 | 4 | 4 |
| Al sulphate. 18 H₂O | | | | | | | | 1 | 1 | 1 | | | | | |
| Methylcellulose | | 30 | 30 | 30 | | | | 30 | 60 | 80 | | | | | |
| Gelatine | | 20 | 20 | 20 | | 10 | | | | | | 30 | | | |
| Ethylene glycol | | 10 | 10 | 10 | | | | 10 | 20 | 30 | | | | | |
| Linseed oil | | | | | | | | | | | | | | 100 | |
| Castor oil | | | | | | | | | | | | | 100 | | |
| Gum arabic | | | | | 100 | 200 | | 30 | 30 | 40 | 20 | | | | |
| Albumen | | | | | | | 30 | 30 | 30 | 40 | 20 | | | | |
| Alginate (tradename "Cohasal") | | | | | | | | | | | 50 | | | | |
| Guaran | | | | | | | | | | | | | | | 100 |
| Casein | | 50 | | | | | | | | | | | 50 | 50 | |
| Collagen | | | | | | | | | | | | 500 | | | |

I claim:

1. A process for the manufacture of edible collagen food casings bearing a water-resistant printed mark, which comprises printing a dry collagen tube with an edible ink comprising:
   a. at least one pigment dyestuff in an amount of 10 to 60% by wt.;
   b. at least one liquid suspending medium for the pigment dyestuff selected from the group consisting of water and plasticizer alcohols, in an amount of 30 – 80% by wt.; and
   c. at least one substance that is cross-linkable by heating alone or in combination with a tanning treatment selected from the group consisting of proteins, cellulose, cellulose derivatives, pectins, gum arabic and alginates, in an amount of 2 – 30 wt.%;

and thereafter subjecting the printed tube to the condition which causes cross-linking of the cross-linkable substance to render the printed mark water-resistant.

2. A process according to claim 1 wherein the pigment dyestuff comprises a titanium dioxide pigment.

3. Product produced by the process of claim 2.

4. A process according to claim 1 wherein the liquid suspending medium comprises a plasticizer alcohol.

5. A process according to claim 4 wherein the alcohol is selected from the group consisting of glycerine, ethylene glycol, and sorbitol.

6. Product produced by the process of claim 4.

7. A process according to claim 1 wherein the edible ink comprises a tanning agent.

8. A process according to claim 7 wherein the tanning agent is selected from the group consisting of glyoxal, glutaraldehyde, formaldehyde, aluminum sulphate, and iron sulphate.

9. A process according to claim 7 wherein the edible ink comprises from 0.01% to 0.5% by weight of the tanning agent.

10. Product produced by the process of claim 7.

11. A process according to claim 1 wherein the cross-linkable substance is selected from the group consisting of proteins and celluloses.

12. A process according to claim 1 wherein the edible ink further comprises an oil.

13. A process according to claim 12 wherein the oil is selected from the group consisting of linseed oil and castor oil.

14. A process according to claim 12 wherein the edible ink comprises from 5 to 25% by weight of the oil.

15. Product produced by the process of claim 12.

16. A process according to claim 1 wherein:
   a. the pigment dyestuff is titanium dioxide;
   b. the liquid suspending medium is ethylene glycol, glycerine or sorbitol; and
   c. the cross-linkable substance is gelatine, albumen, casein, collagen, cellulose, methyl cellulose, ethyl cellulose, pectin, gum arabic or alginate.

17. A process according to claim 16 wherein the ink includes a tanning agent in an amount of 0.01 to 0.5% by weight.

18. A process according to claim 17 wherein the tanning agent is glyoxal, glutaraldehyde, formaldehyde, aluminum sulphate or iron sulfate.

19. Product produced by the process of claim 18.

20. Product produced by the process of claim 17.

21. A process according to claim 16 wherein the ink includes an oil an in amount of 5 to 25 % by weight.

22. A process according to claim 21 wherein the oil is an unsaturated vegetable oil.

23. Product produced by the process of claim 22.

24. Product produced by the process of claim 21.

25. Product produced by the process of claim 16.

26. A process according to claim 1 wherein the edible ink comprises 25 to 50% by weight pigment dyestuff, 50 to 60% by weight of suspending medium, and 10 to 25% cross-linkable substance.

27. Product produced by the process of claim 26.

28. A process according to claim 1 wherein the suspending medium is ethylene glycol.

29. A process according to claim 1 wherein the cross-linkable substance is protein.

30. A process according to claim 1 wherein the cross-linkable substance is cellulose or a cellulose derivative.

31. Product produced by the process of claim 1.

* * * * *

UNITED STATES PATENT AND TRADEMARK OFFICE
CERTIFICATE OF CORRECTION

PATENT NO. : 3,961,082
DATED : June 1, 1976
INVENTOR(S) : Bruno Winkler

It is certified that error appears in the above—identified patent and that said Letters Patent are hereby corrected as shown below:

Title page, amend to designate the assignee as being Naturin-Werk Becker & Co.

Signed and Sealed this

First Day of March 1977

[SEAL]

Attest:

RUTH C. MASON
*Attesting Officer*

C. MARSHALL DANN
*Commissioner of Patents and Trademarks*